United States Patent
Chen et al.

(10) Patent No.: US 9,112,372 B2
(45) Date of Patent: Aug. 18, 2015

(54) POWER CONSUMPTION REDUCTION METHOD FOR A STORED BATTERY

(71) Applicant: Simplo Technology Company, Ltd., Hsinchu County (TW)

(72) Inventors: Ming-Ta Chen, Hsinchu County (TW); Tai-Hung Chen, Hsinchu County (TW); Kuo-Chang Huang, Hsinchu County (TW)

(73) Assignee: SIMPLO TECHNOLOGY COMPANY, LTD., Hukou Township, Hsinchu County (TW)

( * ) Notice: Subject to any disclaimer, the term of this patent is extended or adjusted under 35 U.S.C. 154(b) by 346 days.

(21) Appl. No.: 13/759,049

(22) Filed: Feb. 5, 2013

(65) Prior Publication Data

US 2014/0167700 A1    Jun. 19, 2014

(30) Foreign Application Priority Data

Dec. 18, 2012    (TW) .............................. 101148152 A

(51) Int. Cl.
*H02J 7/00*    (2006.01)
(52) U.S. Cl.
CPC .................................. *H02J 7/0072* (2013.01)
(58) Field of Classification Search
CPC ...................................................... H02J 7/0072
USPC ......................................................... 320/134
See application file for complete search history.

(56) References Cited

U.S. PATENT DOCUMENTS

| | | | |
|---|---|---|---|
| 6,492,791 B1 * | 12/2002 | Saeki et al. | 320/135 |
| 8,154,255 B2 * | 4/2012 | Wang et al. | 320/136 |
| 8,450,975 B2 * | 5/2013 | Kim | 320/134 |
| 2012/0166841 A1 | 6/2012 | Holsen | |
| 2012/0166855 A1 | 6/2012 | Holsen | |

FOREIGN PATENT DOCUMENTS

TW    201251251    12/2012

* cited by examiner

*Primary Examiner* — Jack Chiang
*Assistant Examiner* — Brandon Bowers
(74) *Attorney, Agent, or Firm* — Winston Hsu; Scott Margo

(57) ABSTRACT

A power consumption reduction method controls a rechargeable battery to enter a sleep mode after the electronic system is shutdown with the output current of the rechargeable battery falling under a first current value or the rechargeable battery is in a non-communication status for over a first delay time. When in the sleep mode, a control unit further controls the rechargeable battery to enter a power saving mode when the output voltage of the rechargeable battery falls under a predefined voltage or the RSOC of the rechargeable battery is lower than a percentage of FCC, and the output current of the rechargeable battery falls under a second current value or the rechargeable battery is in the non-communication status for over a second delay time. The method shuts down all power-consuming circuits and components under long-time idling of the battery, capable of preventing overly discharging and malfunction of the rechargeable battery.

10 Claims, 3 Drawing Sheets

POWER CONSUMPTION REDUCTION METHOD FOR A STORED BATTERY

BACKGROUND OF THE INVENTION

1. Field of the Invention

The invention relates to a power control method for a battery, and more particularly, to a power control method for a battery capable of reducing power consumption when the battery is stored.

2. Description of the Prior Art

Considering the convenience of using an electronic system and the capacity requirement of the power supply, most electronic systems adapt rechargeable battery as the source of its power supply, in which the batteries using lithium polymer as core substance are regarded as the most mature products with high capacity density specification. Generally, when a rechargeable battery leaves factory, it should go through some preliminary tests through insertion on an electronic system such as a notebook computer for checking its functionality before the electronic system is shutdown. However, even as the rechargeable battery is installed on a shutdown electronic system, there will still be tiny amount of power consumption, due to the existence of circuits between the rechargeable battery and the electronic system. All the power consumption is caused by the unopened circuits.

A rechargeable battery usually has charge capacity of 40% of its full charge capacity (FCC) when leaving factory. As mentioned, after the rechargeable battery leaves the factory, it needs to go through some tests before set to shutdown to wait for transportation, stocked for a certain period of time, and finally shipped to a user who purchased it. During these stages, the capacity of the rechargeable battery is kept consumed. Overly discharging phenomenon may cause unrecoverable damage to the battery once the battery takes too long in transportation and stock.

While some power saving techniques are implemented in the rechargeable battery according to the prior art, these techniques simply use some sleep modes defined by the rechargeable battery, i.e., when the rechargeable battery has power consumption lower than a specific value like 20 mA for over a specific time like 30 seconds, it is set in the sleep mode, and the rechargeable battery does not provide power for the electronic system. The rechargeable battery in such sleep mode, however, still has closed circuit between the battery and the electronic system, which means tiny amount of power consumption still occurs.

SUMMARY OF THE INVENTION

To get to a solution to the overly discharging problem due to constant power consumed for long-term storage after the battery is first manufactured, an embodiment of the invention provides a power consumption reduction method for a stored battery. In which a rechargeable battery is installed in an electronic system and includes a control unit, a battery set, and a Metal-Oxide-Semiconductor Field Effect Transistor (MOSFET) module. The MOSFET module includes a discharging MOSFET and a charging MOSFET. The method includes using the control unit to perform the following steps: when an output current of the battery set is detected by the control unit to be under a first current value for over a first delay time, or when the battery set is detected by the control unit to be in a non-communication status for over the first delay time, the control unit controlling the rechargeable battery to enter a sleep mode; when the rechargeable battery is configured in the sleep mode, and either an output voltage of the battery set is detected by the control unit to be under a predefined voltage or a relative state of capacity (RSOC) of the battery set is detected by the control unit to be lower than a critical percentage value, and either the output current is detected by the control unit to be under a second current value for over a second delay time or the battery set is detected by the control unit to be in a non-communication status for over the second delay time, the control unit controlling the rechargeable battery to enter a power saving mode.

The power consumption reduction method for a stored battery provided by the invention provides that the control unit controlling the rechargeable battery to enter the sleep mode includes step: the control unit turning off the charging MOSFET, thereby opening a charging circuit of the rechargeable battery, while the discharging MOSFET is maintained turned-on and a discharging circuit of the rechargeable battery is maintained closed.

The power consumption reduction method for a stored battery provided by the invention provides that the control unit controlling the rechargeable battery to enter the power saving mode includes step: the control unit turning off the discharging MOSFET, thereby opening a discharging circuit of the rechargeable battery, and the control unit shutting down itself.

The power consumption reduction method for a stored battery provided by the invention provides that the first current value is 20 mA, the first delay time is 30 seconds, the second current value is 10 mA, the second delay time is 48 hours, the critical percentage value is 3%, and the predefined voltage is 3.3V.

The power consumption reduction method for a stored battery provided by the invention provides that the second current value is not greater than the first current value.

The power consumption reduction method for a stored battery provided by the invention provides that a wake-up line is further included to be connected between the electronic system and the rechargeable battery. The method further includes step: when the rechargeable battery is configured in the power saving mode, the electronic system activating the control unit by providing a voltage for the control unit via the wake-up line The power consumption reduction method for a stored battery provided by the invention provides that when the battery set is in the non-communication status, a clock pin and a data pin of the battery set are both maintained at a low level status or at a high level status.

With the method provided by the invention, when the rechargeable battery is in the sleep mode, a number of determining conditions may be checked to control the rechargeable battery to enter a power saving mode with complete opened circuit therebetween. Any closed circuit between the rechargeable battery and the electronic system and the control unit itself will be shutdown and consume no more power, especially when the rechargeable battery is in long term unused condition. The method can effectively prevent overly discharge of the rechargeable battery and provide practicable security mechanism.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
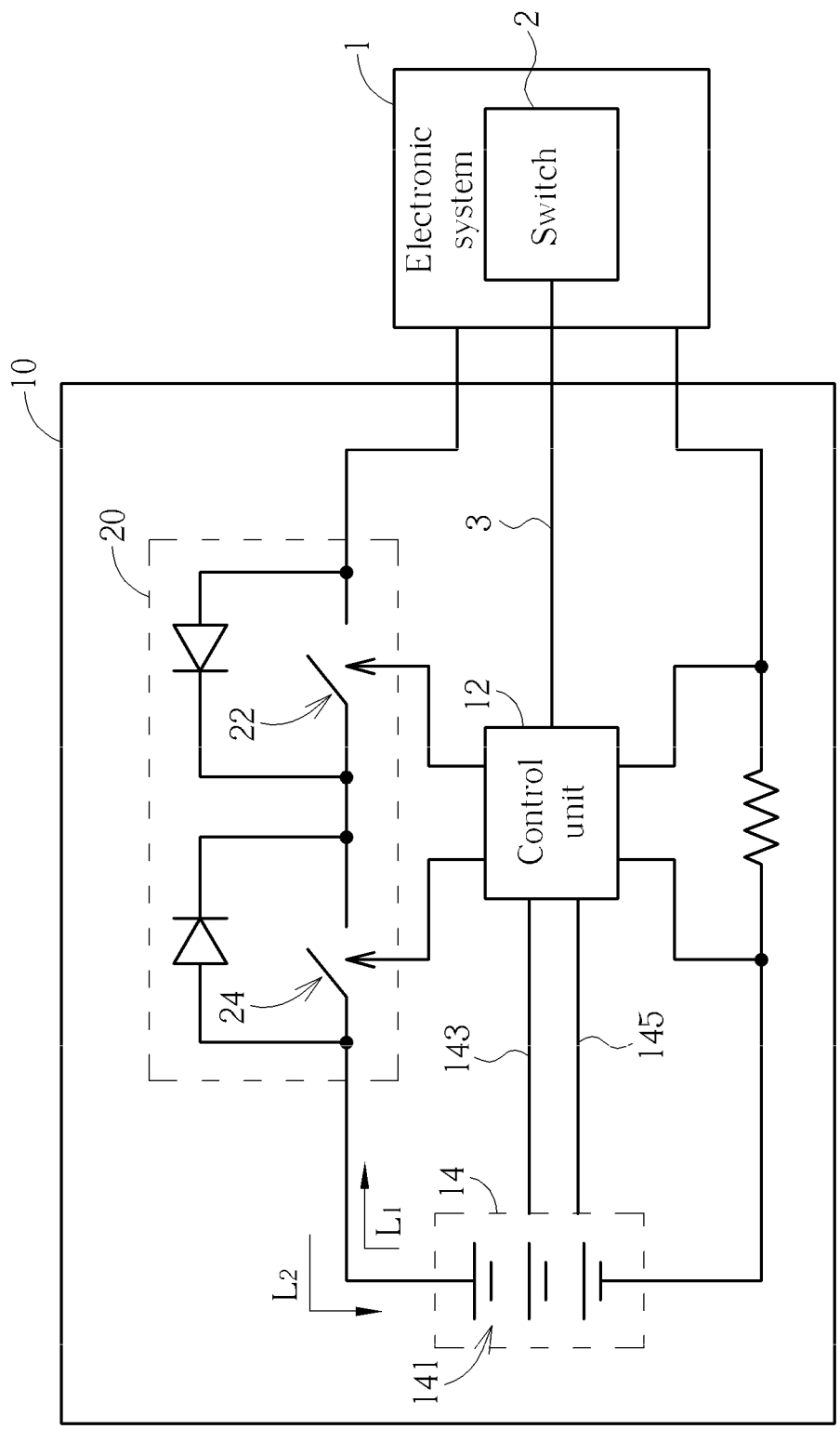
FIG. 1 is an illustration of an electronic system installed with a rechargeable battery.

Please refer to FIG. 1. FIG. 1 is an illustration of an electronic system installed with a rechargeable battery. An electronic system 1 is powered by a rechargeable battery 10, which includes a control unit 12, a battery set 14, and a Metal-Oxide-Semiconductor Field Effect Transistor (MOSFET) module 20. The control unit 12 is a control IC of the rechargeable battery 10 and is electrically connected to the battery set 14, the MOSFET module 20 and is adapted to detect and monitor the battery set 14. The battery set 14 is composed of a plurality of battery cells 141 that are connected with one another serially, in parallel, or both. Preferably, the battery cells 141 are lithium polymer batteries. The MOSFET module 20 includes a discharging MOSFET (DXG MOSFET) 22 and a charging MOSFET (CHG MOSFET) 24. The control unit 12 is in charge of turning on and off the DXG MOSFET 22 and the CHG MOSFET 24. When the DXG MOSFET 22 and the CHG MOSFET 24 are turned on, a charging circuit $L_2$ and a discharging circuit $L_1$ exist respectively in the rechargeable battery 10. The electronic system 1 further utilizes a switch 2 and a wake-up line 3 to carry out the activation of the control unit 12.

Figure 2:
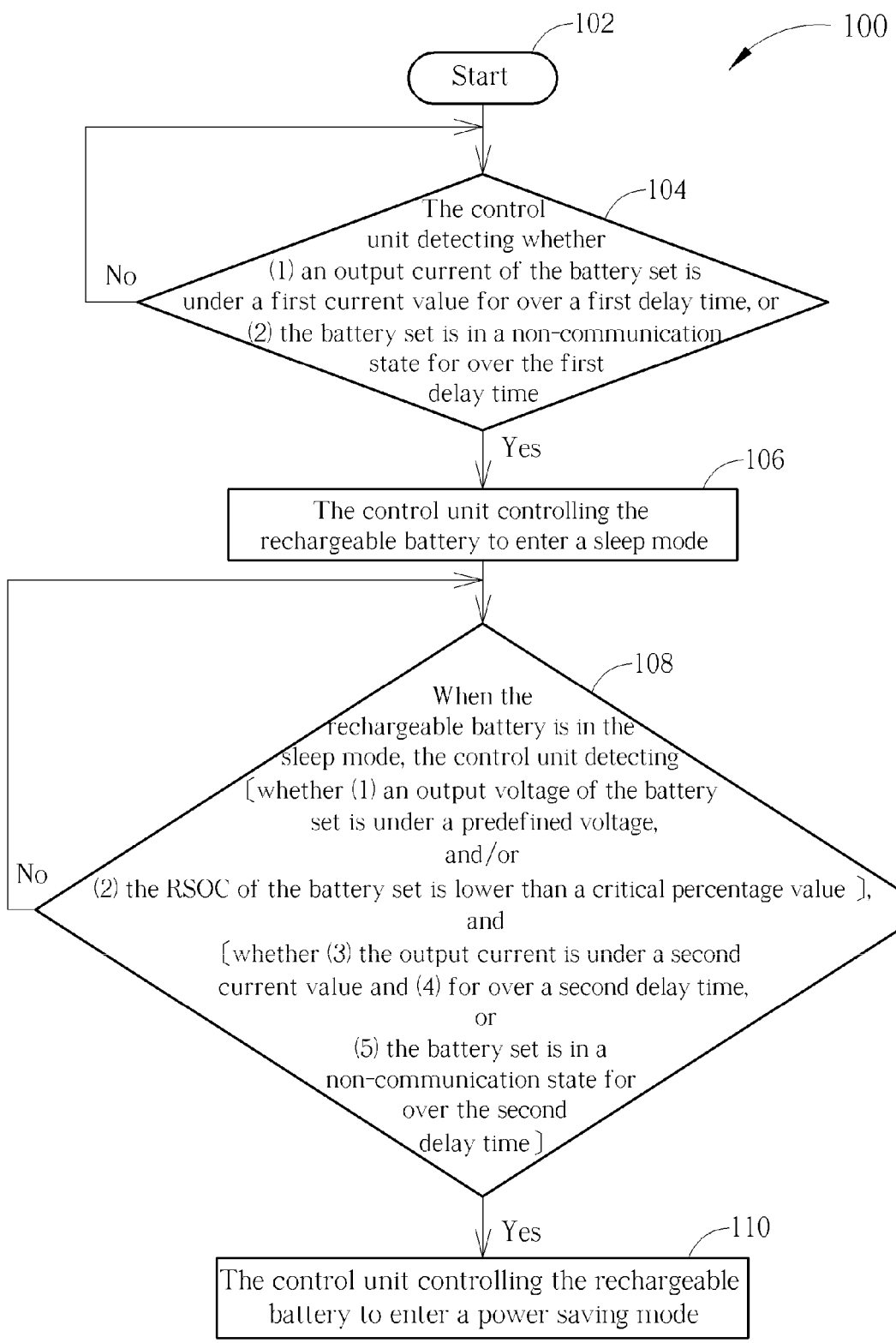
FIG. 2 is an illustration of a flow chart of a power consumption reduction method for a stored rechargeable battery in the electronic system.

Please refer to FIG. 2. FIG. 2 is an illustration of a flow chart of a power consumption reduction method 100 for a stored rechargeable battery 10 in the electronic system 1. The method 100 includes the following steps:

Step 102: Start;

Step 104: The control unit detecting whether an output current of the battery set is under a first current value for over a first delay time, or the control unit detecting whether the battery set is in a non-communication status for over the first delay time;

Step 106: The control unit controlling the rechargeable battery to enter a sleep mode;

Step 108: When the rechargeable battery is configured in the sleep mode, the control unit detecting whether an output voltage of the battery set is under a predefined voltage and/or a relative state of capacity (RSOC) of the battery set is lower than a critical percentage value, and detecting whether the output current is under a second current value for over a second delay time or the battery set is in a non-communication status for over the second delay time;

Step 110: The control unit controlling the rechargeable battery to enter a power saving mode.

The invention provides a way for the control unit 12 of the rechargeable battery 10 to determine whether to configure the rechargeable battery 10 to a power saving mode according to specific conditions, without the need of modifying the hardware wirings or putting extra burden to the electronic system. In Steps 104, 106, when the control unit 12 detects that the output current of the battery set 14 falls under the first current value for over the first delay time, the control unit 12 controls the rechargeable battery 10 to enter the sleep mode. An exemplary value of the first current value may be 20 mA and the first delay time may be 30 seconds, but these parameters should not be regarded as a limitation to the invention. In other words, given the rechargeable battery 10 is in connection with the electronic system 1, even as the electronic system 1 is under a shutdown status, there will still be tiny amount of current consumption to the rechargeable battery 10, which in general will not be exceeding 20 mA, because the charging circuit $L_2$ and the discharging circuit $L_1$ are still at the closed status. As a result, when the rechargeable battery 10 is connected to the electronic system 1, the control unit 12 controls the rechargeable battery 10 to enter the sleep mode 30 seconds after the electronic system 1 is turned to the shutdown status. Additionally, there is another way for the control unit 12 to determine whether to control the rechargeable battery 10 to enter the sleep mode by detecting the non-communication status of the battery set 14 that lasts for over the first delay time. More specifically, a non-communication status of the battery set 14 may be defined by that both a clock pin 143 and a data pin 145 of the battery set 14 are maintained at a low level status or at a high level status. If such non-communication status exists in the battery set 14 for the first delay time, the rechargeable battery 10 may also be configured to enter the sleep mode. Here the sleep mode contains a procedure that the control unit 12 turns off the CHG MOSFET 24, thereby opening the charging circuit $L_2$ of the rechargeable battery 10. On the other hand, the DSG MOSFET 22 remains turned on for providing a closed discharging circuit $L_1$.

Once the rechargeable battery 10 enters the sleep mode as in Step 106, the control unit 12 steps to the next determining, by considering other conditions, whether to configure the rechargeable battery 10 in another mode, the power saving mode described. For example, after the rechargeable battery 10 leaves the factory, it needs to go through some tests before set to shutdown to wait for transportation, stocked for a certain period of time, and finally shipped to a user who purchased it. During these stages, the rechargeable battery 10 in the electronic system 1 may first be placed at a status that satisfies the conditions of Step 104 and be controlled to enter the sleep mode (Step 106). In the sleep mode, the rechargeable battery 10 usually, but not limited to, has lesser output current than that when the rechargeable battery 10 has not entered the sleep mode since the charging circuit $L_2$ is opened. The rechargeable battery 10 still consumes tiny power until the control unit 12 controls the rechargeable battery 10 to enter the power saving mode when the following conditions are satisfied: (1) the output voltage of the battery set 14 of the rechargeable battery 10 is under the predefined voltage, say 3.3V, and/or (2) the relative state of capacity (RSOC) of the battery set 14 is lower than a critical percentage value, 3% for example, of FCC, and (3) the output current of the rechargeable battery 10 in the sleep mode is detected to be under a second current value like 10 mA for (4) over a second delay time, 48 hours for example, or (5) the battery set 14 is detected to be in the non-communication status for over the second delay time. When these conditions are satisfied in Step 108, the rechargeable battery 10 enters the power saving mode, preventing overly discharging of the rechargeable battery 10.

It should be noted in more detail about Step 108. Several different combinations of the conditions described in Step 108 may be implemented to demonstrate the method of the invention to determine whether the conditions for the rechargeable battery 10 to enter the power saving mode are satisfied. For example, one of the combinations may be (1) the output voltage of the battery set 14 is under the predefined voltage and (3) the output current of the rechargeable battery 10 is under the second current value for (4) over the second delay time. Another combination may be (2) the relative state of capacity (RSOC) of the battery set 14 is lower than the critical percentage value and (5) the battery set 14 is in the non-communication status for over the second delay time. Another combination may be (1) the output voltage of the battery set 14 is under the predefined voltage and meanwhile (2) the relative state of capacity (RSOC) of the battery set 14 is lower than the critical percentage value and (3) the output current of the rechargeable battery 10 is under the second current value for (4) over the second delay time. Still another combination may be (1) the output voltage of the battery set 14 is under the predefined voltage and meanwhile (2) the relative state of capacity (RSOC) of the battery set 14 is lower than the critical percentage value and (5) the battery set 14 is in the non-communication status for over the second delay time. All these combinations exemplified above may be possible implementations, but not limited to, of the invention to determine whether or not to have the rechargeable battery 10 enter the power saving mode in Step 110. These written examples should be regarded as for descriptive purpose and many more combinations deduced from the above description but not described literally should also be implementable on account of the invention.

In the power saving mode in Step 110, the control unit 12 will further turn off the DXG MOSFET 22. In other words, the discharging circuit $L_1$ is opened in the power saving mode, and meanwhile the control unit 12 shutting down itself. Since all the circuits and components including the control unit 12 itself are opened or shutdown when the rechargeable battery 10 is in the power saving mode, there will be no power consumed for the battery set 14, and overly discharging of the rechargeable battery 10 may be prevented. The critical percentage value having an example as 3% or lower value for the embodiment gives an implementing environment for the invention that when the rechargeable battery 10 is under the condition of having extra low capacity, but such concern should not be a limitation to the invention.

Figure 3:
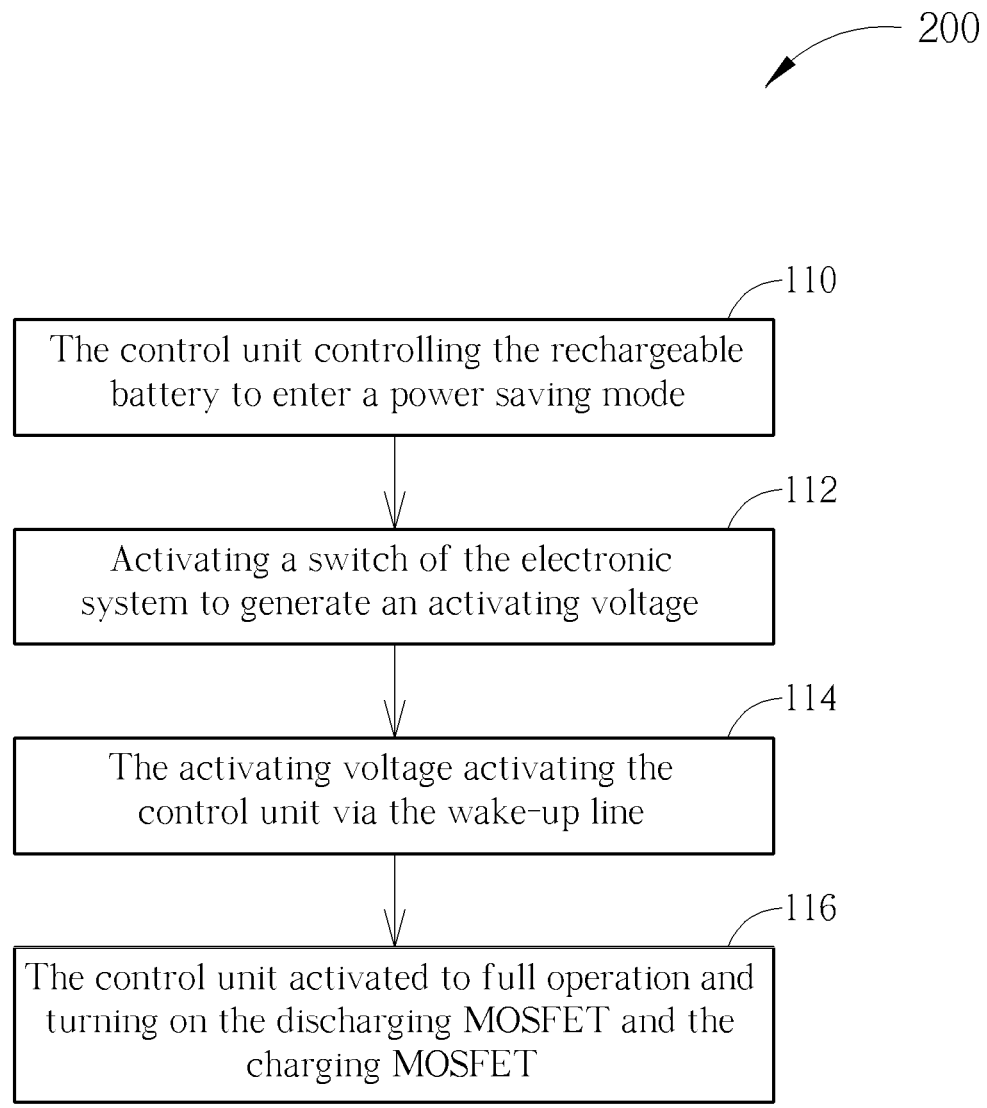
FIG. 3 is an illustration of a flow chart of a method for activating the rechargeable battery after the method in FIG. 2.

Please refer to FIG. 3. FIG. 3 is an illustration of a flow chart of a method 200 for activating the rechargeable battery after the method 100. The method 200 includes the following steps:

Step 110: The control unit controlling the rechargeable battery to enter a power saving mode;

Step 112: Activating a switch of the electronic system to generate an activating voltage;

Step 114: The activating voltage activating the control unit via the wake-up line;

Step 116: The control unit activated to full operation and turning on the discharging MOSFET and the charging MOSFET.

The activating voltage is preferably designated as 6V but not a limitation.

The power consumption reduction method for a stored battery provided in the invention does not need to modify current layout or to increase extra burden to an electronic system. The method controls a rechargeable battery to enter a sleep mode after the electronic system is shutdown with the output current of the rechargeable battery falling under a first current value or the rechargeable battery is in a non-communication status for over a first delay time. When in the sleep mode, the control unit of the rechargeable battery further controls the rechargeable battery to enter a power saving mode when the output voltage of the rechargeable battery falls under a predefined voltage or the RSOC of the rechargeable battery is lower than a percentage of its FCC, and the output current of the rechargeable battery falls under a second current value or the rechargeable battery is in the non-communication status for over a second delay time. The method shuts down all power-consuming circuits and components under long-time idling of the battery, capable of preventing overly discharging and malfunction of the rechargeable battery.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power consumption reduction method for a stored battery, wherein a rechargeable battery is installed in an electronic system and comprises a control unit, a battery set, and a Metal-Oxide-Semiconductor Field Effect Transistor (MOSFET) module, the MOSFET module comprising a discharging MOSFET and a charging MOSFET, the method comprising using the control unit to perform the following steps:

when an output current of the battery set is detected by the control unit to be under a first current value for over a first delay time, or when the battery set is detected by the control unit to be in a non-communication status for over the first delay time, the control unit controlling the rechargeable battery to enter a sleep mode; and when the rechargeable battery is configured in the sleep mode, and either an output voltage of the battery set is detected by the control unit to be under a predefined voltage or a relative state of capacity (RSOC) of the battery set is detected by the control unit to be lower than a critical percentage value, and either the output current is detected by the control unit to be under a second current value for over a second delay time or the battery set is detected by the control unit to be in a non-communication status for over the second delay time, the control unit controlling the rechargeable battery to enter a power saving mode.

2. The method of claim 1, wherein the control unit controlling the rechargeable battery to enter the sleep mode comprises step: the control unit turning off the charging MOSFET, thereby opening a charging circuit of the rechargeable battery, while the discharging MOSFET remains turned-on and a discharging circuit of the rechargeable battery remains closed.

3. The method of claim 1, wherein the control unit controlling the rechargeable battery to enter the power saving mode comprises step: the control unit turning off the discharging MOSFET, thereby opening a discharging circuit of the rechargeable battery.

4. The method of claim 3, wherein the control unit controlling the rechargeable battery to enter the power saving mode further comprises step: the control unit shutting down itself.

5. The method of claim 1, wherein the first current value is 20 mA and the first delay time is 30 seconds.

6. The method of claim 1, wherein the second current value is 10 mA and the second delay time is 48 hours.

7. The method of claim 1, wherein the critical percentage value is 3% and the predefined voltage is 3.3V.

8. The method of claim 1, wherein a wake-up line is further comprised to be connected between the electronic system and the rechargeable battery, the method further comprising step: when the rechargeable battery is configured in the power saving mode, the electronic system activating the control unit by providing a voltage for the control unit via the wake-up line.

9. The method of claim 1, wherein the second current value is not greater than the first current value.

10. The method of claim 1, wherein when the battery set is in the non-communication status, a clock pin and a data pin of the battery set are both maintained at a low level status or at a high level status.

* * * * *